United States Patent Office
2,745,842
Patented May 15, 1956

2,745,842

PREPARATION OF N,N'-DIACYLHEXAMETHYL-
ENEDIAMINES AND AN INTERMEDIATE

George E. Munn, Wilmington, Del., assignor to E. I. du
Pont de Nemours and Company, Wilmington, Del., a
corporation of Delaware No Drawing. Application February 15, 1952,
Serial No. 271,857

7 Claims. (Cl. 260—332.2)

This invention relates to a novel process for preparing diamides of the formula acyl-NH-$(CH_2)_6$-NH-acyl, and to novel intermediates which are useful in the said process for making these diamides.

It has been known for many years that organic compounds containing sulfur can be desulfurized by reduction in the presence of metallic nickel (Bougeault et al., Bull. Soc. Chim., 7, 780 et seq. (1940); Mozingo et al., J. Amer. Chem. Soc., 65, 1013–1016 (1943). It has also been known that hydrogenation of certain alkyl-substituted thiophenes gives hydrogen sulfide and branched chain alkanes (U. S. 2,429,575). However, such desulfurization reactions have not been employed heretofore in the synthesis of hexamethylenediamine or diamides related thereto.

An object of this invention is to provide a process for preparing N,N'-diacyl hexamethylenediamines from sources which have not heretofore been employed for this purpose. Another object is to prepare novel intermediates which are useful in manufacturing hexamethylenediamine and related materials. Other objects of the invention will appear hereinafter.

It has been discovered in accordance with this invention that alpha, alpha'-di(acylamidomethyl)thiophene reacts with metallic nickel containing adsorbed hydrogen, to give diacyl hexamethylenediamines in accordance with the following equation:

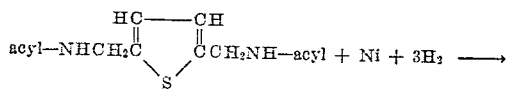

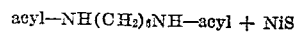

acyl—NH($CH_2$)$_6$NH—acyl + NiS

The metallic nickel which is employed in the practice of this invention may be in the form of relatively pure finely divided nickel or in various activated forms, such as in the form of nickel-aluminum alloys which have converted in part to skeletal forms of the metal having hydrogen adsorbed therein, made by treating the alloy with reagents which react with the aluminum component to form hydrogen. Another method for preparing the nickel-hydrogen component of the reaction mixture is to impose a pressure of hydrogen upon the nickel component. Other suitable methods, such as those involving the use of nickel hydride, are also effective.

It is generally desirable to employ a relatively inert solvent for the diacylamidomethylthiophene in carrying out the process of this invention. Suitable inert organic solvents for this purpose include methanol, ethanol, isopropanol, methyl glycol ether, 1,4-dioxane, dioxolane, etc.

The reaction is preferably carried out in the liquid phase, i. e. the organic reactant is in the liquid phase during the course of the reaction, and the temperatures are preferably those at which a liquid phase can exist. Suitable temperatures are within the range of 25° to 200° C., but temperatures outside of this range may also be used.

It has been found somewhat surprisingly that the reaction does not take place satisfactorily in the presence of hydrogen and only catalytic amounts of nickel. The quantity of nickel required, therefore, is stoichiometrically equivalent to the quantity of sulfur to be removed. Unadsorbed hydrogen may be present in the reaction mixture, but this is not at all necessary.

The invention is illustrated further by means of the following examples.

Example 1.—10 grams of alpha, alpha'-dibenzamidomethylthiophene was heated in 400 milliliters of methanol underrefluxing conditions at atmospheric pressure for four hours with 46 grams of hydrogen-containing nickel-aluminum alloy hydrogenation catalyst, prepared by treating nickel-aluminum alloy with aqueous sodium hydroxide. The resulting reaction mixture was cooled, and the nickel metal was separated therefrom by filtration. Concentration of the filtrate by evaporation of methanol gave 6 grams of N,N'-hexamethylenedibenzamide, which corresponds to a yield of 65% of the theoretical.

Example 2.—Example 1 is repeated using alpha, alpha'-diacetamidomethylthiophene in place of alpha, alpha'-dibenzamidomethylthiophene. The reaction product obtained was N,N'-hexamethylenediacetamide.

The N,N'-diacylhexamethylenediamines which are obtained in accordance with the process of this invention are highly useful as materials which can be very readily converted to hexamethylenediamine. This can be shown by the following experiment illustrating the formation of hexamethylenediamine from N,N'-hexamethylenediacetamide:

A mixture of 20 grams (0.1 mol) of N,N'-hexamethylenediacetamide, 1 gram of ammonium phosphate, and 100 grams of ammonia was heated in a shaker tube for 3 hours. The product was washed into a flask with dioxane, and the solvent was removed from the mixture by distillation. The residue was distilled under diminished pressure, yielding 8.0 grams of a distillate boiling at 130°–160° C. at 93 mm. This distillate was dissolved in methanol mixed with a methanolic solution of benzoic acid and poured into an excess of ether to precipitate the salt formed. A yield of 14.9 grams of hexamethylenediammonium benzoate having a melting point of 199° to 201° C. was obtained. This corresponds to the formation of 4.8 grams of hexamethylenediamine or a conversion of the N,N'-diacylhexamethylenediamine to the diamine amounting to 41.4%. The diamines and salts obtainable therefrom are highly effective as intermediates in the manufacture of hexamethylenediamine polyamide resins.

The alpha, alpha'-diacylamidomethylthiophenes which are required as reactants in the practice of this invention are obtainable by reaction between thiophene and the corresponding methylolamides. For example, alpha, alpha'-dibenzamidomethylthiophene is readily prepared by adding an acetic acid solution of N-methylolbenzamide to a solution of thiophene (2 mols of the amide per mol of thiophene) in acetic acid containing a catalytic quantity of sulfuric acid at 0° C. The alpha, alpha'-dibenzamidomethylthiophene obtained by the ensuing reaction is purified by removing the solvent and recrystallizing the resulting residue from methanol.

It is to be understood that the invention is not limited to the specific illustrations hereinabove set forth, but is limited only as set forth in the following claims.

I claim:

1. In a process for preparing N,N'-diacylhexamethylenediamines the step which comprises converting alpha, alpha'-diacylamidomethylthiophene to N,N'-diacylhexamethylenediamines by subjecting alpha, alpha'-diacylamidomethylthiophene, wherein the diacylamido groups are selected from the class consisting of diacetylamido and dibenzoylamido groups, to the action of metallic nickel containing adsorbed hydrogen, and thereafter separating the resulting N,N'-diacylhexamethylenediamine from the resulting mixture.

2. The process of claim 1, as carried out in the liquid phase in the presence of an inert organic solvent for the alpha, alpha'-diacylamidomethylthiophene.

3. The process of claim 2 wherein the inert organic solvent is methanol.

4. A process for preparing N,N'-hexamethylenedibenzamide which comprises heating alpha, alpha'-dibenzamidomethylthiophene in the liquid phase in an inert organic liquid medium with metallic nickel containing adsorbed hydrogen at a temperature within the range of 25° to 200° C. and thereafter separating N,N'-hexamethylenedibenzamide from the resulting mixture.

5. A process for preparing N,N'-hexamethylenediacetamide which comprises heating alpha, alpha'-diacetamidomethylthiophene with metallic nickel in the presence of an inert organic medium in the liquid phase at a temperature of 25 to 200° C. and thereafter separating from the resulting mixture the N,N'-hexamethylenediacetamide produced by the ensuing reaction.

6. alpha, alpha'-Diacetylamidomethylthiophene.

7. alpha, alpha'-Dibenzamidomethylthiophene.

References Cited in the file of this patent

UNITED STATES PATENTS

| | | |
|---|---|---|
| 2,130,947 | Carothers et al. | Sept. 20, 1938 |
| 2,267,685 | Kyrides | Dec. 23, 1941 |
| 2,487,051 | Mozingo et al. | Nov. 8, 1949 |
| 2,508,860 | Grimmel | May 23, 1950 |
| 2,528,306 | Hartough et al. | Oct. 31, 1950 |
| 2,533,798 | Hartough et al. | Dec. 12, 1950 |

OTHER REFERENCES

Ruggli et al.: Helv. Chim. Acta., vol. 30, pp. 1845–52 (1947).

Griffing et al.: JACS, vol. 70, pp. 3416–19 (1948).